(12) United States Patent
Hafez et al.

(10) Patent No.: US 10,135,506 B2
(45) Date of Patent: Nov. 20, 2018

(54) LOW COMPLEXITY FLEXIBLE BEAM-WIDTH FOR DIRECTIONAL MODULATION

(71) Applicants: Mohammed Hafez, Tampa, FL (US); Huseyin Arslan, Tampa, FL (US); Tamer Khattab, Doha (QA)

(72) Inventors: Mohammed Hafez, Tampa, FL (US); Huseyin Arslan, Tampa, FL (US); Tamer Khattab, Doha (QA)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 15/827,813

(22) Filed: Nov. 30, 2017

(65) Prior Publication Data

US 2018/0152229 A1  May 31, 2018

Related U.S. Application Data

(60) Provisional application No. 62/428,195, filed on Nov. 30, 2016.

(51) Int. Cl.
*H04B 7/06* (2006.01)
*H04B 7/0456* (2017.01)
(Continued)

(52) U.S. Cl.
CPC ............. *H04B 7/0456* (2013.01); *H01Q 3/26* (2013.01); *H01Q 3/40* (2013.01); *H01Q 21/245* (2013.01);
(Continued)

(58) Field of Classification Search
CPC .. H04B 7/0456; H04B 7/0617; H04B 7/0697; H01Q 21/245; H01Q 3/26
See application file for complete search history.

(56) References Cited

U.S. PATENT DOCUMENTS

2017/0026146 A1* 1/2017 Tollefson ................. H04K 1/02

OTHER PUBLICATIONS

On Directional Modulation: An Analysis of Transmission Scheme with Multiple Directions, by Mohammed Hafez and Huseyin Arslan, dated Jun. 2015 as indicated in the IDS filed on Apr. 30, 2018.*

(Continued)

*Primary Examiner* — Siu Lee
(74) *Attorney, Agent, or Firm* — Michael Best & Friedrich LLP (57) ABSTRACT

Method and system for transmitting a directionally modulated data stream via an antenna array. A first signal processing circuitry receives a data symbol of a first data stream, maps the first data stream to a specified number of sub-beams based on a stream beam-width assignment, assigns a direction angle for transmission of the data stream, and transmits in parallel, for each of the specified number of sub-beams, an instance of the data symbol to a second signal processing circuitry. The second signal processing circuitry generates antenna array element weights based on the data symbol and a matrix having a DFT structure. The matrix is independent of the assigned direction angle. The data symbol is transmitted via the antenna array utilizing the antenna array element weights. The DFT is implemented as a fast Fourier transform. White noise is transmitted in the sub-beams beams outside the beam-width requirement of the data stream.

19 Claims, 5 Drawing Sheets

(51) Int. Cl.
   *H01Q 21/24* (2006.01)
   *H01Q 3/26* (2006.01)
   *H01Q 3/40* (2006.01)
   *H01Q 25/00* (2006.01)
   *H01Q 3/28* (2006.01)

(52) U.S. Cl.
   CPC ........... *H01Q 25/00* (2013.01); *H04B 7/0617* (2013.01); *H04B 7/0697* (2013.01); *H01Q 3/28* (2013.01)

(56) References Cited

OTHER PUBLICATIONS

Aggrawal et al., "Ultra-Wideband Pulse-Based Directional Modulation," IEEE International Microwave and RF Conference, 2015, 4 pages.
Alrabadi et al., "Directional Space-Time Modulation: A Novel Approach for Secured Wireless Communication," IEEE International Conference on Communications (ICC), 2012, pp. 3554-3558.
Andrews et al., "What Will 5G Be?," IEEE Journal on Selected Areas in Communications, 2014, vol. 32, No. 6, pp. 1065-1082.
Colman, "Spatial Hopping in MIMO Systems for Impeded Signal Reception by Multi-Element Eavesdroppers," IEEE Wireless Communications Letters, 2013, vol. 2, No. 6, 647-650.
Daly et al., "Beamsteering in Pattern Reconfigurable Arrays Using irectional Modulation," IEEE Transactions on Antennas and Propagation, 2010, vol. 58, No. 7, pp. 2259-2265.
Daly et al., "Demonstration of Directional Modulation Using a Phased Array," IEEE Transactions on Antennas and Propagation, 2010, vol. 58, No. 5, pp. 1545-1550.
Daly et al., "Directional Modulation and Coding in Arrays," IEEE International Symposium on Antennas and Propagation (APSURSI), 2011, pp. 1984-1987.
Daly et al., "Directional Modulation Technique for Phased Arrays," IEEE Transactions on Antennas and Propagation, 2009, vol. 57, No. 9, pp. 2633-2640.
Ding et al., "A Vector Approach for the Analysis and Synthesis of Directional Modulation Transmitters," IEEE Transactions on Antennas and Propagation, 2014, vol. 62, No. 1, pp. 361-370.
Ding et al., "Establishing Metrics for Assessing the Performance of Directional Modulation Systems," IEEE Transactions on Antennas and Propagation, 2014, vol. 62, No. 5, pp. 2745-2755.
Ding et al., "MIMO Inspired Synthesis of Directional Modulation Systems," IEEE Antennas and Wireless Propagation Letters, 2016, vol. 15, pp. 580-584.
Garcia et al., "Intercarrier Interference in OFDM: A General Model for Transmissions in Mobile Environments with Imperfect Synchronization," EURASIP Journal on Wireless Communications and Networking, Hindawi Publishing Corporation, 2009.
Hafez et al., "On Directional Modulation: An Analysis of Transmission Scheme with Multiple Directions," IEEE International Conference on Communications Workshops (ICCW), London, UK, Jun. 2015, pp. 459-463.
Hafez et al., "Secure Multiple-Users Transmission Using Multi-Path Directional Modulation", IEEE International Conference on Communications (ICC), Kuala Lumpur, Malaysia, May 2016.
Hanif et al., "On Linear Precoding Strategies for Secrecy Rate Maximization in Multiuser Multi-antenna Wireless Networks," IEEE Transactions on Signal Processing, 2014, vol. 62, No. 14, pp. 3536-3551.
Hong et al., "Dual-Beam Directional Modulation Technique for Physical-Layer Secure Communication," IEEE Transactions on Antennas and Propagation, 2011, vol. 10, pp. 1417-1420.
Ju et al., "Secure Transmissions in Millimeter Wave Systems," IEEE Transactions on Communications, 2017, vol. 65, No. 5, 2114-2127.
Kalantari et al., "Secure M-PSK Communication Via Directional Modulation," IEEE, 2016, 5 pages.
Khisti et al., "Secure Transmission With Multiple Antennas I: The MISOME Wiretap Channel," IEEE Transactions on Information Theory, 2010, vol. 56, No. 7, pp. 3088-3104.
Li, Information-Guided Randomization for Wireless Physical Layer Secure Transmission, IEEE, 2013, 6 pages.
Roh et al., "Millimeter-Wave Beamforming as an Enabling Technology for 5G Cellular Communications: Theoretical Feasibility and Prototype Results," IEEE Communications Magazine, 2014, vol. 52, No. 2, pp. 106-113.
Sayeed, "Deconstructing Multiantenna Fading Channels," IEEE Transactions on Signal Processing, 2002, vol. 50, No. 10, pp. 2563-2579.
Shannon, "Communication theory of secrecy systems," Bell Syst. Tech. J., vol. 29, pp. 656-715, 1949.
Valliappan et al., "Antenna Subset Modulation for Secure Millimeter-Wave Wireless Communication," IEEE Transactions on Communications, 2013, vol. 61, No. 8, pp. 3231-3245.
Wyner, "The wire-tap channel," Bell Syst. Tech. J., vol. 54, No. 8, pp. 1355-1387, 1975.
Yusuf et al., "Short Paper: Secure Multi-User Transmission using CoMP Directional Modulation," IEEE, 2015, 2 pages.
Zhou et al., "Fundamentals of Physical Layer Security," Physical layer security in wireless communications, 2013, CRC Press, Chapter 1, pp. 1-14.
Zhou et al., "MIMO Signal Processing Algorithms for Enhanced Physical Layer Security," Physical layer security in wireless communications, 2013, CRC Press, Chapter 6, pp. 93-110.

\* cited by examiner

LOW COMPLEXITY FLEXIBLE BEAM-WIDTH FOR DIRECTIONAL MODULATION

CROSS-REFERENCE TO RELATED APPLICATIONS

This application is a non-provisional of and claims the benefit of U.S. Provisional Patent Application Ser. No. 62/428,195, filed on Nov. 30, 2016, the entire contents of which are incorporated herein by reference.

STATEMENT REGARDING FEDERALLY SPONSORED RESEARCH OR DEVELOPMENT

This invention was made with government support 1247503 awarded by the National Science Foundation. The Government has certain rights to the invention.

TECHNICAL FIELD

The invention relates to a method and system for directional modulation, and particularly a low complexity implementation that provides transmission in multiple directions, secure communication links, and flexible beam width assignments.

BACKGROUND OF THE INVENTION

There is great concern over confidentiality in wireless data exchanges due to the ever increasing use of wireless networks and the vulnerability of a wireless channel to various types of eavesdropping and security threats. Alongside the conventional cryptography algorithms, physical-layer-security was introduced to provide an extra level of protection against malicious attacks.

Physical-layer security uses the random nature of a wireless channel to secure a path for the data transmission. In general, using multiple antennas introduces additional degrees-of-freedom (DoF) in a communication system. These extra degrees of freedom can be used to provide desired secrecy requirements. One strategy recently utilized for providing secrecy in multi-antenna systems is directional modulation (DM).

Directional modulation is a transmission side process. It enables the transmission of a confidential message towards a certain pre-specified direction, while transmitting random patterns along other directions. The DM algorithm uses a set of data-driven attenuators and phase-shifters along with antenna arrays, in order to have such control over the transmitted pattern. Algorithms have been proposed for single direction transmission, multi-direction transmission, and a multi-user multi-path-based system. All these techniques, however, focus on optimizing secrecy features of directional modulation, while leaving the beam-shape to be decided based on the physical structure of the transmission antenna array.

Moreover, research in the spatial domain has inspired great interest, especially with consideration of massive multiple-input, multiple-output (MIMO) and hybrid beam forming as enabling technologies for 5G networks. The sparse nature of wireless channels in the future-targeted mm-wave frequency range initiated a new point of view towards conventionally used channel models. This new perspective encouraged the deployment of large antenna arrays and beam-forming algorithms.

However, the aforementioned fixed structure for directional modulation may not be well suited for the expected highly dynamic 5G networks. Moreover, the prior multi-user scheme adopts a high complexity structure and the use of zero-forcing algorithms.

SUMMARY OF THE INVENTION

In one embodiment, a method for transmitting a directionally modulated data stream via an antenna array includes receiving, by a first signal processing circuitry, a first data symbol of a first data stream comprising the first data symbol for transmission via the antenna array. The first data stream comprising the first data symbol is mapped to a specified number of sub-beams based on a transmission beam-width assigned to the first data stream comprising the first data symbol. A direction angle is assigned for transmission of the first data stream comprising the first data symbol. For each of the specified number of sub-beams, an instance of the first data symbol is transmitted to a second signal processing circuitry. A second signal processing circuitry generates antenna array element weights for transmitting the first data symbol via the antenna array. The antenna array element weights are generated based on the first data symbol and a matrix having a discrete Fourier transform structure. The matrix is independent of the transmission direction angle assigned to the first data stream. The first data symbol is transmitted via the antenna array utilizing the array element weights.

In one embodiment, a system for transmitting a directionally modulated data stream via an antenna array includes an antenna array. The first signal processing circuitry receives a data symbol of a first data stream comprising the data symbol for transmission via the antenna array, maps the first data stream comprising the data symbol to a specified number of sub-beams based on a transmission beam-width assigned to the data stream comprising the data symbol, assigns a direction angle for transmission of the data stream comprising the data symbol, and transmits in parallel, for each of the specified number of sub-beams, an instance of the data symbol to a second signal processing circuitry. A second signal processing circuitry of the system generates antenna array element weights for transmitting the data symbol via the antenna array. The antenna array element weights are generated based on the data symbol and a matrix having a discrete Fourier transform structure. The matrix is independent of the assigned transmission direction angle. The data symbol is transmitted via the antenna array utilizing the antenna array element weights.

A method for transmitting a data stream using directional modulation includes determining a fixed generation matrix that is based on a model of a transmitter configured to transmit in a plurality of directional transmission beams. Weights associated with the transmission directions are calculated based on the fixed generation matrix and the data streams to be transmitted. The data streams are transmitted via an antenna array according to the weights and a steering vector. The generation matrix includes a fixed Fast-Fourier Transform (FFT) matrix. Each data stream has a beam-width requirement and a transmission angle for a particular receiver. Complex additive white Gaussian noise may be added to the data streams before transmission such that noise is transmitted in directions outside of the beam-width requirement of a respective data stream. A data stream may be transmitted via a plurality of directional sub-beams when the beam-width requirement of the data stream is greater than a width of a single directional sub-beam. A multipath environment is considered for transmitting a data stream.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A method and system for a low-complexity implementation of directional modulation is provided, which provides transmission in multiple directions, secure communication links, and flexible beam widths. Based on a virtual channel representation, the proposed method and system divides the spatial domain into a set of narrow sub-beams. Each transmitted data stream is then mapped to a subset of these sub-beams based on a desired angular transmission direction and beam-width. Such a design provides a secure communication link for each of the transmitted data streams, a straightforward extension to multi-path environments, a simple implementation using a fixed discrete-Fourier-transform (DFT) generation matrix, and an adaptive direction and beam-width assignment for each of the transmitted data streams. Utilizing the simple implementation of the fixed DFT generation matrix reduces complexity when changing the generation matrix for a change of any transmission direction Furthermore, a low complexity extension to a large number of antennas and a large number of users is enabled by the use of the DFT in the low complexity fixed generation matrix for direction modulation with multiple directions. Moreover, flexible beam assignments that include direction and beam-width are provided for different users, while communication link security achieved through direction modulation is maintained.

A short review is provided for the two main concepts discussed herein, namely, directional modulation and virtual channel representation Directional Modulation In conventional beam forming, a data stream is fed to antenna elements and complex weights of the antenna array are used only to control a transmitted power pattern. In contrast, directional modulation uses the data stream to generate the weights of the array. This structure allows the projection of the data stream towards a certain direction while randomizing the transmitted pattern for all other directions. Based on this structure, the received pattern at a certain direction θ can be represented as:

$$f(\theta,k) = h^H(\theta) w(k), \quad (1)$$

where w is the vector containing the array weights at the time index k, and h(θ) is the steering vector of the array towards the direction θ. The steering vector for a uniform linear array (ULA) of size N is given as, $$h(\theta) = \left[ e^{-j\left(\frac{N-1}{2}\right)\frac{2\pi d}{\lambda}\cos\theta}, e^{-j\left(\frac{N-1}{2}-1\right)\frac{2\pi d}{\lambda}\cos\theta}, \ldots, e^{j\left(\frac{N-1}{2}\right)\frac{2\pi d}{\lambda}\cos\theta} \right]^T. \quad (2)$$

where λ is the carrier wavelength, and d is the spacing between the array elements.

Based on the idea of directional modulation, we set $w = [w_1(k), w_2(k), \ldots, w_N(k)]^T$, so that $f(\theta_d, k) = x(k)$, where $x(k)$ is the data symbol to be transmitted, and $\theta_d$ is the desired transmission direction. For a multi-direction transmission, a zero-forcing approach leads the weights to take the form, $$w(k) = Dx(k) = H(H^H H)^{-1} x(k), \quad (3)$$

with $$H = [h(\theta_1), h(\theta_2), \ldots, h(\theta_P)], \quad (4)$$

where, $\theta_i$ is the direction of transmission for the $i^{th}$ data stream, P is the total number of streams to be transmitted simultaneously, $x = [x_1(k), x_2(k), \ldots, x_P(k)]^T$ are the data to be transmitted and $H^H$ is the conjugate transpose of H.

Virtual Channel Representation

Instead of using the black-box statistical representation of the spatial channel, which represents the link between each transmitting and receiving antenna, a more detailed insight on the physical structure of the channel may be obtained by the means of a virtual model. The virtual model considers that the channel consists of N virtual transmitting directions, and M virtual receiving directions, where N and M are the number of array elements at the transmitter and receiver, respectively.

Hence, the channel matrix can be deconstructed as, $$G = A_R G_v A_T^H, \quad (5)$$

where $A_T = \{\alpha_{pq}^{(T)}\}_{N \times N}$ and $A_R = \{\alpha_{pq}^{(R)}\}_{M \times M}$ are the steering response of the array at transmitter and receiver, respectively. The steering response matrix entries for the transmitter are given by, $$\alpha_{pq}^{(T)} = \frac{1}{\sqrt{N}} \exp\left[-j2\pi\left(p - \frac{N-1}{2}\right)\frac{d}{\lambda}\cos\theta_q^{(T)}\right]. \quad (6)$$

where p, q ∈ [0, 1, N−1]. The virtual directions here should represent orthogonal spatial basis, in order for them to reflect independent information about the channel. To ensure orthogonality of these basis the directions $\theta_q^{(T)}$ should be selected as, $$\theta_q^{(T)} = \arccos\left[\frac{\lambda}{dN}\left(q - \frac{N-1}{2}\right)\right], \quad (7)$$

and the same thing applies for $A_R$, and p, q ∈ [0, 1, ..., M−1]. The selection of such basis would make $A_T$ have a DFT matrix structure.

$G_v = \{g_{mn}\}_{M \times N}$ is the random channel matrix, which provides some insight on the physical structure of the channel. For example, a dense matrix would reflect an environment rich in scatterers, while a sparse scatter matrix indicates that the channel has distributed sets of scatterers.

DFT-Based Directional Modulation

A multi-direction directional modulation transmission scheme with a simple DFT-based structure is proposed. This structure provides simple implementation utilizing a fixed FFT matrix, and adaptive angular direction and beam-width assignment In one embodiment, a communication system may have a single base-station (BS) 110 that is equipped with an N-sized ULA. The BS 100 has P independent data streams $x = [x_1(k), x_2(k), \ldots, x_P(k)]$ that are transmitted towards P different directions $\Theta = [\theta_1, \theta_2, \theta_P]$. Moreover, each of the independent data streams has its own beam-width requirement $\phi = [\varphi_1, \varphi_2, \ldots, \varphi_P]$. All legitimate receivers and unintended non-legitimate receivers (e.g., eaves droppers) are considered to be equipped with a single antenna. The communication channel is considered to be a single-path fading channel.

The ULA response acts as an inverse DFT-process that performs a transformation from the spatial-location domain to the spatial-angular domain. The spatial-angular domain may be controlled by including a DFT-process into the generation of the array weights.

Figure 1:
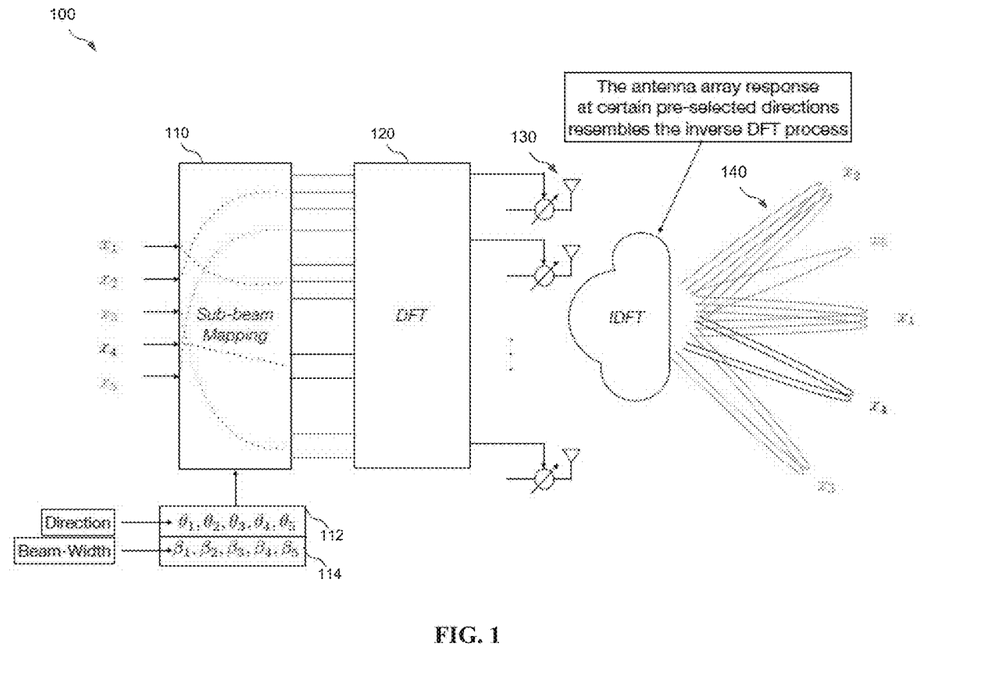
FIG. 1 is a block diagram of a system that is operable to generate array weights for DFT based direction modulation according to an embodiment of the invention.

FIG. 1 is a block diagram of a system that is operable to generate array weights for DFT based directional modulation according to an embodiment of the present invention. Referring to FIG. 1, a wireless base station system 100 includes sub-beam mapping circuitry 110, discrete Fourier transform (DFT) circuitry 120, a plurality of antenna array elements 130, and a plurality of transmitted sub-beams 140.

The wireless base station system 100 may receive, at the sub-mapping circuitry 110, a plurality of data streams $x_i$, for example, $x_1$, $x_2$, $x_3$, $x_4$, and $x_5$. The wireless base station system 100 processes the data streams, and transmits the data streams via the antenna array 130 within the sub-beams 140, to a plurality of receiver devices. The receiver devices may be any of various types of devices, including, but not limited to, a wireless mobile phone, a personal computer system, a desktop computer, a laptop, a notebook or netbook computer, a mainframe computer system, a handheld computer, a workstation, network computer, a camera, a set top box, a video game console, a handheld video game device, and the like.

The sub-beam mapping circuitry 110 also receives a plurality of transmission angle assignments $\theta_i$ that may be referred to as transmission directions. Each of the transmission angles corresponds to a respective one of the input data streams and indicates an angle for transmission of the respective data stream to a particular receiver device, for example, an angle in azimuth and/or elevation. The transmission angle assigned for a particular receiver device may be determined by the base station and/or the receiver device based on angle-of-arrival (AoA) estimation or any other suitable method.

The sub-beam mapping circuitry 110 receives a plurality of beam-width assignments $\beta_i$ for transmitting the plurality of data streams. Each of the beam-width assignments corresponds to a respective one of the input data streams and indicates a beam-width assigned for transmitting the respective data stream to a specific receiver device via the antenna array 130. The beam-width assigned for transmitting a particular data stream may comprise a single one of the plurality of sub-beams 140, or it may comprise a plurality of the sub-beams 140. For example, the data stream $x_2$ may be assigned a beam-width that is transmitted at the output of the antenna array 130 as a combination of three of the plurality of sub-beams 140. The beam-width assignments may be determined by beam forming processing by the base station 100 and/or a receiver device. The beam-width and angle information may be utilized to control the phase and relative amplitude of transmission of a signal by each transmitter of the array 130.

The spatial channel is reciprocal. As such, in one embodiment, the angle-of-arrival of signals received at the wireless base station 100 from a particular receiver device may be estimated to determine the transmission directions for that receiver device. The directions of energy received at the wireless base station 100 from the receiver device may be used to determine a transmission beam width assignment or number of sub-beams for transmissions to the receiver device. If the received energy is concentrated in a direction, a small transmission beam width, which includes sub-beams only in the direction of the received high energy, is assigned. If the receive energy is evenly distributed over multiple directions, a larger beam width and greater number of sub-beams are assigned for transmissions to the receiver device.

The sub-beam mapping circuitry 110 utilizes a beam-width assigned to a particular data stream to determine how many sub-beams of a specified sub-beam width are needed to propagate a signal carrying the particular data stream to a target receiver. Based on the number of sub-beams needed to fulfill the beam-width assignment, the sub-beam mapping circuitry outputs a separate data stream comprising the particular data stream for each of the sub-beams. For example, if a data stream requires three sub-beams to meet the beam-width assignment for the data stream, the sub-beam mapping circuitry outputs the data stream at three output interfaces and transmits the three streams to the DFT processing circuitry 120. This process is performed for all of the input data streams $x_i$. In other words, when a data symbol is assigned to more than one sub-beam, the same data symbol is fed to multiple corresponding DFT inputs. A sub-beam index at the DFT input corresponds to one of the pre-defined transmission directions. The sub-beam mapping circuitry 110 uses the determined transmission direction information to assign each of the data streams to a corresponding DFT input index.

The DFT circuitry 120 receives the plurality of data streams from the sub-beam mapping circuitry for each of the sub-beams and performs the transformation from the spatial-location domain to the spatial-angular domain and by including a DFT-process into the generation of the array weights. The DFT circuitry 120 uses the data stream to generate weights of the array 130. This structure allows the projection of the data stream towards a certain direction while randomizing the transmitted pattern for all other directions.

Figure 2:
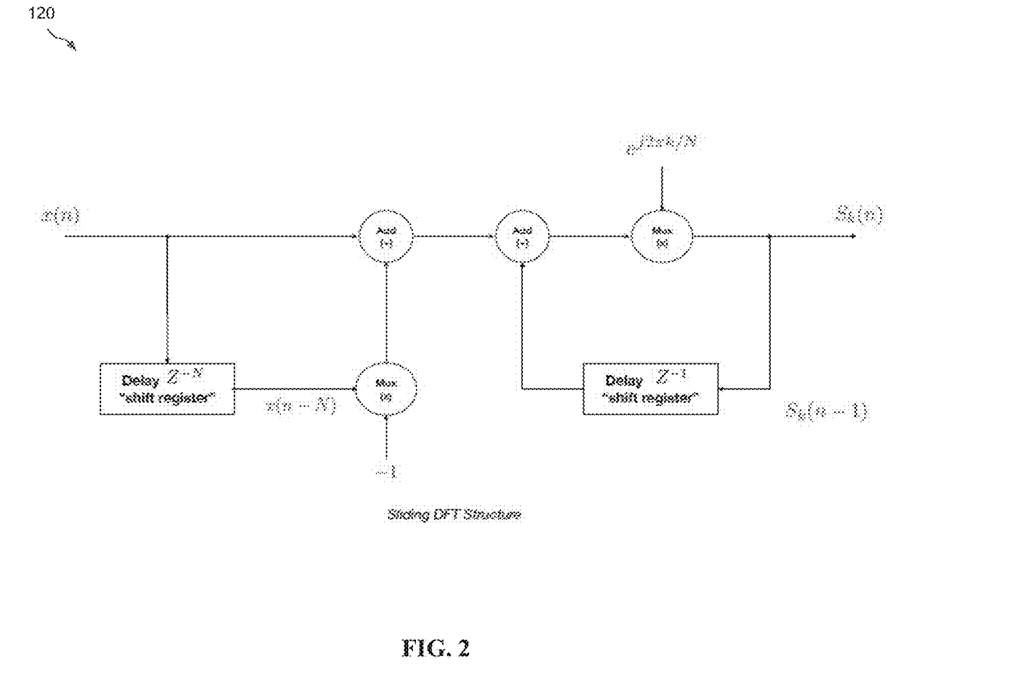
FIG. 2 is a block diagram of a DFT system for use in directional modulation.

FIG. 2 is a block diagram of a DFT system for use in a directional modulation system. Referring to FIG. 2, DFT processing circuitry 120 implements a sliding DFT algorithm to provide low latency. The sliding DFT implementation may be useful for directional modulation, in order to provide competitive data rates.

Although the DFT processing circuitry 120 shown in FIG. 2 implements a sliding DFT algorithm, the embodiments are not limited to any specific type of DFT implementation circuitry and any suitable DFT circuitry may be utilized (e.g., to implement a Radix algorithm with pipelined or Systolic architectures).

Unlike an OFDM system structure, in this embodiment, both of the DFT and inverse DFT processing are located at the transmitter. The response characteristics of the antenna array 130 effectively performs an inverse DFT process on the $x_i$ data stream signals transmitted in the sub-beams 140 via the antenna array 130. The transmitted sub-beams 140 may be considered to be analogous to sub-carriers in an OFDM system.

Array weights can be generated by the DFT circuitry 120 based on:

$$w(k) = A_T x_N(k), \quad (8)$$

where $x_N(k)$ is a N×1 vector containing the data to be transmitted $x_i(k)$ mapped to their corresponding sub-beam indexes. The transmitted signal is given as, $$f(\theta,k) = h^*(\theta)w(k) = h^*(\theta)A_T x_N(k)$$

The system structure for equation (8) has several benefits:

- The generation matrix $A_T$ needs to be constructed only for a single time, which makes it independent of the transmission directions $\theta_i$. This independence will simplify the adaptation process in case of change in one of the transmission directions. Only the sub-beam assignment will need to be changed for the change in directions.
- The generation matrix has a DFT structure, which can make the weights generation process less complex by implementing it using an FFT-algorithm.
- With the availability of large size arrays (N>>1), this structure provides the flexibility in the total beam-width assigned for each transmitted stream. If one stream requires a large beam-width (due to a larger area of coverage requirement or suffering from a blockage in the communication channel), assigning a set of sub-beams to the same data stream would serve as a single large beam that satisfies the required beam width.

Moreover, a directional modulation method and system provides a secure communication path for each of the data streams. The signal delivered to any receiver will take the form:

$$r(k) = Gw(k) + z(k) = A_R G_v x_N(k) + z(k), \quad (9)$$

where z is a complex additive white Gaussian Noise. Based on the adopted model of single antenna receiver and single path channel, $A_R=1$, and $G_v=\{g_n\}_{1 \times N}$. If we consider a subset of the transmission direction N that contains only the sub-beams affecting the receiver, then, $$|g_n| = 0 \; \forall n \notin \aleph. \quad (10)$$

We define another set of sub-beams P that contain the transmitted information $x_i(k)$. Then, $$r(k) = z(k) \; \forall n \notin (\aleph \cap \mathcal{P}). \quad (11)$$

This refers to the case where the receiver is aligned to any of the virtual beam directions or sub-beams that are not utilized for transmission. In such case there is no information transmitted toward the location of this receiver.

Secrecy problems may occur in two situations. In a first situation, a receiver (eavesdropper) is aligned to an information beam that is meant for another receiver. For example, referring to FIG. 3, the eavesdropping receiver device may be aligned with one of the secrecy concern transmission direction areas 210 having the 20° and 30° band-widths. Various methods are available to prevent detection of the information by the eavesdropping receiver located in one of the secrecy concern transmission direction areas 210. For example, multi-path environment characteristics may be utilized for an extension of the proposed method and system for use in multi-path channels. The knowledge of the channels of different users can be incorporated by applying a multi-user precoding (e.g., zero-forcing). The multi-user precoding will provide a location based security, by insuring orthogonality between transmitted signals at the desired locations, while enhancing the interference in the other locations.

In a second situation, secrecy problems may arise when a receiver (eavesdropper) is outside of information carrying transmission beam-width that is directed to another receiver, but the eavesdropping receiver is not aligned to any of the other virtual transmitted beam directions. For example, referring to FIG. 3 the second situation occurs when a receiver is aligned to the secrecy concern transmission direction area 220. Here, out-of-band transmissions at an angle outside of the main lobe of any beam (utilized or non-utilized) may be reduced in the information carrying transmission to mitigate detection of the information by the eavesdropper. Moreover, artificial noise may be inserted into the non-utilized sub-beams to reduce the SNR of the information carrying transmission beam at the receiver. However, the introduction of artificial noise must be carefully managed to avoid self-interference in a multi-path environment.

The second situation can be represented by a mismatch between the generation matrix $A_T$ and the transmission steering matrix $\tilde{A}_T$, where the received signal will be:

$$r(k) = G_v \tilde{A}_T^H A_T x_N(k) + z(k). \quad (12)$$

This resembles the case of an OFDM transmission with inter-carrier-interference due to sampling offset. Utilizing the imperfect synchronization equation of the OFDM:

$$\eta = \frac{1}{N_s^2} \frac{\sin^2\{\pi[\Delta fT(1+\Delta T/T)]N_s\}}{\sin^2\{\pi[\Delta fT(1+\Delta T/T)]\}} \quad (13)$$

we can define the average received power of the desired symbol transmitted at a certain direction, normalized to the symbol power, as:

$$\eta(\theta) = \frac{\sin^2\{\pi\beta(\theta)N_s\}}{N_s^2 \sin^2\{\pi\beta(\theta)\}} \quad (14)$$

where $\beta(\theta) = \Delta\theta/\pi$, and $\Delta\theta = |\theta_d - \theta|$ is the difference between the direction of the desired symbol and the direction of the eavesdropper. Hence the received SINR at the eavesdropper for the symbol $x_p$ would be:

$$\gamma(\theta) = \frac{\eta_p(\theta)}{\sum_{i \neq p} \eta_i(\theta) + \sigma_z^2} \quad (15)$$

One embodiment may utilize an array of size N=127, with array spacing d=λ/2. A transmission may be directed towards three directions θ=[35°, 90°, 115°], with beam-width requirements φ=[20°, 10°, 25°]. The transmitted data streams are uncoded QPSK modulated.

Figure 3:
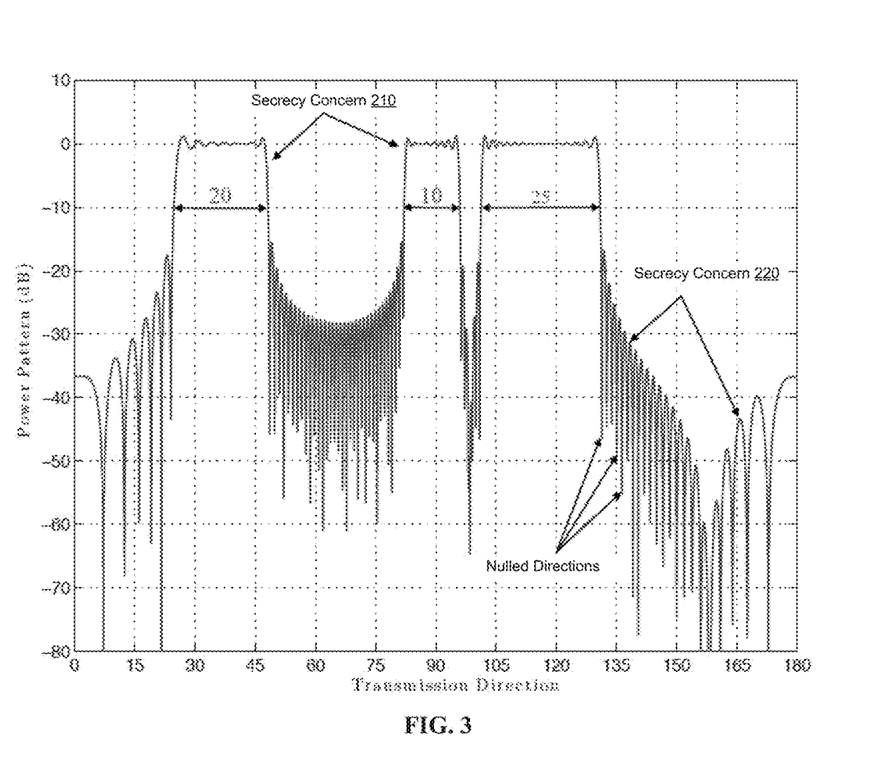
FIG. 3 is a graphical representation of a transmitted power pattern with three different desired directions and different beam-width requirements.

FIG. 3 is a graphical representation of a transmitted power pattern with three different desired transmission directions, and different beam-width requirements. The power pattern represented in FIG. 3 illustrates the flexibility in varying beam-widths based on multiple sub-beams. A first main lobe having a beam-width of 20° propagates a signal carrying a first data stream, a second main lobe having a beam-width of 10° propagates a signal carrying a second data stream, and a third main lobe having a beam width of 25° propagates a signal carrying a third data stream.

Figure 4:
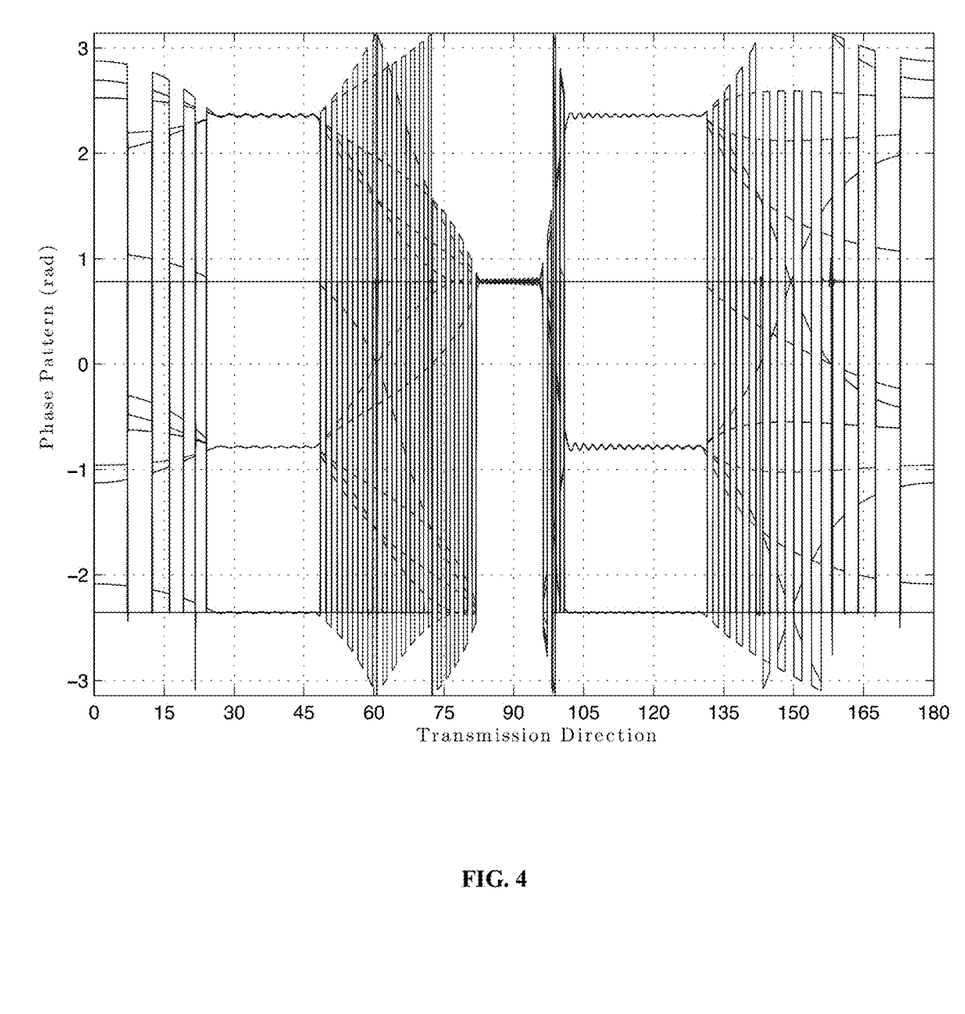
FIG. 4 is a graphical representation of a transmitted phase pattern for three desired transmission directions.

FIG. 4 is a graphical representation of a transmitted phase pattern for three desired transmission directions where the stream transmitted towards 90° has a single realization. In order to reveal randomization of the phase in FIG. 4, a single constellation point was transmitted towards 90° and full constellations were transmitted in the other two transmission directions. As shown in FIG. 4, the phase takes the constellation values within the intended data stream transmission beam-widths, while having a high uncertainty outside these beam-widths.

Figure 5:
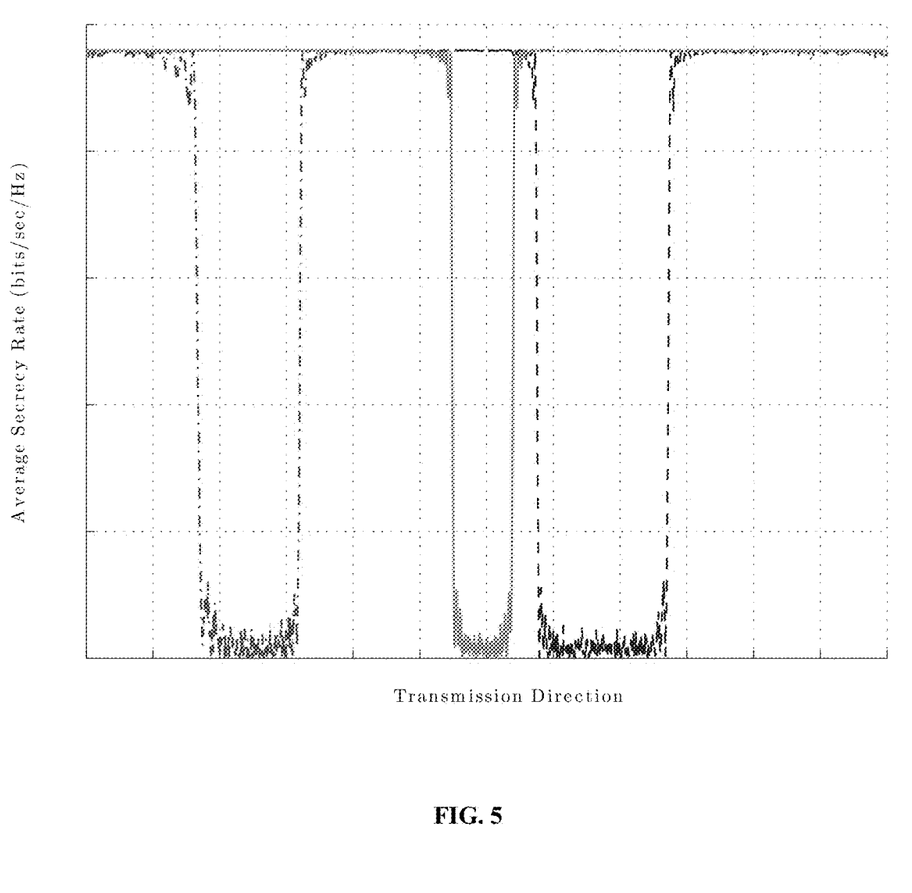
FIG. 5 is a graphical representation of an average secrecy rate for each transmitted stream.

FIG. 5 is a graphical representation of an average secrecy rate for each transmitted stream. FIG. 5 illustrates a secrecy performance for the direction modulation method and system described herein. The average achievable secrecy rate is calculated as:

$$R_S(\theta)=\log_2(1+\gamma_p)-\log_2(1+\gamma(\theta)), \quad (15)$$

where $\gamma_p$ is the signal-to-noise-ratio (SNR) received by the legitimate receiver and is set as $\gamma_p=10$ dB, while the eavesdropper is given a noiseless channel $\sigma_z^2=0$. The eavesdropper channel suffers a degraded signal due to the multiuser interference imposed from the other transmitted streams.

The method and system described herein provides a secure communication link for each of the transmitted data streams through the use of multi-user interference. The method and system can easily be modified to fit multi-path environments and multiple receiving antennas systems. Moreover, the secrecy features of the method and system may be enhanced by the insertion of artificial noise signal to the non-utilized sub-beams.

A method of securely transmitting a data stream via directional modulation includes determining, by an electronic processor, a fixed generation matrix based on a model of a transmitter configured to transmit in a plurality of transmission direction beams. The method also includes calculating, by the electronic processor weights associated with a transmission direction based on the fixed generation matrix and the data stream, and transmitting, via a transmitter, the data stream according to the weights and a steering vector.

Although the invention has been described in detail with reference to certain preferred embodiments, variations and modifications exist within the scope and spirit of one or more independent aspects of the invention as described.

What is claimed is:

1. A method for transmitting a directionally modulated data stream via an antenna array, the method comprising:
   receiving, by a first signal processing circuitry, a first data symbol of a first data stream comprising the first data symbol for transmission via the antenna array;
   mapping the first data stream comprising the first data symbol to a specified number of sub-beams based on a transmission beam-width assigned to the first data stream comprising the first data symbol;
   assigning a direction angle for transmission of the first data stream comprising the first data symbol; and
   transmitting in parallel, for each of the specified number of sub-beams, an instance of the first data symbol to a second signal processing circuitry;
   generating, by the second signal processing circuitry, antenna array element weights for transmitting the first data symbol via the antenna array, wherein the antenna array element weights are generated based on the first data symbol and a fixed matrix having a discrete Fourier transform structure, the fixed matrix being independent of the transmission direction angle assigned to the first data stream; and
   transmitting the first data symbol via the antenna array utilizing the array element weights.

2. The method of claim 1 further comprising:
   receiving, by the first signal processing circuitry, a plurality of data streams for transmission via the antenna array, each and every one of the plurality of data streams comprising a respective first data symbol, wherein the plurality of data streams comprises the first data stream;
   mapping each and every one of the plurality of data streams to a respective specified number of sub-beams based on a respective transmission beam-width assigned to the respective data stream of the plurality of data streams;
   assigning a respective transmission direction angle to each and every one of the plurality of data streams; and
   for each and every one of the plurality of data streams, transmitting in parallel, an instance of the respective first data symbol of the respective data stream for the specified number of sub-beams mapped to the respective data stream, to the second signal processing circuitry;
   generating, by the second signal processing circuitry, antenna array element weights for transmitting the first data symbols of the plurality of data streams via the antenna array, wherein the array element weights are generated based on the first data symbols of the plurality of data streams and the fixed matrix having the discrete Fourier transform structure, the fixed matrix being independent of the assigned transmission direction angles of the plurality of data streams; and
   transmitting the first data symbols of the plurality of data streams via the antenna array utilizing the antenna array element weights.

3. The method of claim 1, wherein the fixed matrix having the discrete Fourier transform structure is implemented as a fast Fourier transform by the second signal processing circuitry.

4. The method of claim 1, wherein indexed values in the fixed matrix having the discrete Fourier transform structure are based on characteristics of the antenna array that indicate a steering response of the antenna array.

5. The method of claim 1, wherein the assigned beam-width of the first data stream is implemented using a set of sub-beams transmitting the first data stream.

6. The method of claim 1 further comprising, transmitting white noise in non-utilized sub-beams, wherein the non-utilized sub-beams do not have an assigned data stream.

7. The method of claim 1 further comprising, wherein a transmission response of the antenna array performs an inverse discrete Fourier transform on the plurality of data steams when they are transmitted via the antenna array elements.

8. A system for transmitting a directionally modulated data stream via an antenna array, the system comprising:
   an antenna array;
   a first signal processing circuitry, wherein the first signal processing circuitry:
      receives a data symbol of a first data stream comprising the data symbol for transmission via the antenna array;
      maps the first data stream comprising the data symbol to a specified number of sub-beams based on a transmission beam-width assigned to the first data stream comprising the data symbol;

assigns a direction angle for transmission of the first data stream comprising the data symbol; and transmits in parallel, for each of the specified number of sub-beams, an instance of the data symbol to a second signal processing circuitry; and a second signal processing circuitry, wherein the second signal processing circuitry:

generates antenna array element weights for transmitting the data symbol via the antenna array, wherein the antenna array element weights are generated based on the data symbol and a fixed matrix having a discrete Fourier transform structure, the fixed matrix being independent of the assigned transmission direction angle; and transmits the data symbol via the antenna array utilizing the antenna array element weights.

9. The system of claim 8, wherein:

the first signal processing circuitry further:

receives a plurality of data streams for transmission via the antenna array, each and every one of the plurality of data streams comprising a respective first data symbol, wherein the plurality of data streams comprises the first data stream;

maps each and every one of the plurality of data streams to a respective specified number of sub-beams based on a respective transmission beam-width assigned to the respective data stream of the plurality of data streams;

assigns a respective transmission direction angle to each and every one of the plurality of data streams; and for each and every one of the plurality of data streams, transmits in parallel, an instance of the respective first data symbol of the respective data stream for the specified number of sub-beams mapped to the respective data stream, to the second signal processing circuitry; and the second signal processing circuitry further:

generates antenna array element weights for transmitting the first data symbols of the plurality of data streams via the antenna array, wherein the array element weights are generated based on the first data symbols of the plurality of data streams and the fixed matrix having the discrete Fourier transform structure, the fixed matrix being independent of the assigned transmission direction angles of the plurality of data streams; and transmits the first data symbols of the plurality of data streams via the antenna array utilizing the antenna array element weights.

10. The system of claim 8, wherein the fixed matrix having the discrete Fourier transform structure is implemented as a fast Fourier transform by the second signal processing circuitry.

11. The system of claim 8, wherein indexed values in the fixed matrix having the discrete Fourier transform structure are based on characteristics of the antenna array that indicate a steering response of the antenna array.

12. The system of claim 8, wherein the assigned beam-width of the first data stream is implemented using a set of sub-beams transmitting the first data stream.

13. The system of claim 8, further comprising, transmitting white noise in non-utilized sub-beams, wherein the non-utilized sub-beams do not have an assigned data stream.

14. The system of claim 8, wherein a transmission response of the antenna array performs an inverse discrete Fourier transform on the plurality of data steams when the plurality of data streams are transmitted via the antenna array elements.

15. A method of transmitting a data stream via directional modulation, the method comprising:

determining, by an electronic processor, a fixed generation matrix based on a model of a transmitter configured to transmit in a plurality of transmission direction beams;

calculating, by the electronic processor, weights associated with a transmission direction based on the fixed generation matrix and the data stream; and transmitting, via a transmitter, the data stream according to the weights and a steering vector, wherein the fixed generation matrix includes a fixed Fast-Fourier Transform matrix.

16. The method of claim 15, wherein the data stream includes a beam-width requirement.

17. The method of claim 16, wherein transmitting the data stream includes adding a complex additive white Gaussian Noise such that noise is transmitted to the direction beams outside the beam-width requirement of the data stream.

18. The method of claim 16, wherein transmitting the data stream includes transmitting the data steam in a plurality of direction beams when the beam-width requirement of the data stream is higher than the width of a single direction beam.

19. The method of claim 15, wherein transmitting the data stream includes considering a multi-path environment for transmitting the data stream.

* * * * *